United States Patent
Qian et al.

(10) Patent No.: US 7,702,223 B2
(45) Date of Patent: Apr. 20, 2010

(54) CIRCUIT FOR CONTROLLING ROTATION SPEED OF COMPUTER FAN

(75) Inventors: Cheng Qian, Shenzhen (CN); Ning Wang, Shenzhen (CN); Yong-Zhao Huang, Shenzhen (CN); Hua Zou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 237 days.

(21) Appl. No.: 12/036,273

(22) Filed: Feb. 24, 2008

(65) Prior Publication Data

US 2009/0175602 A1 Jul. 9, 2009

(30) Foreign Application Priority Data

Jan. 4, 2008 (CN) .................... 2008 1 0300025

(51) Int. Cl.
*H02P 7/00* (2006.01)

(52) U.S. Cl. .................... 388/825; 388/811; 388/819; 388/829; 318/268; 318/434; 361/395

(58) Field of Classification Search .............. 388/811, 388/819, 825, 829; 318/268, 434; 62/126, 62/181; 700/299; 361/395
See application file for complete search history.

(56) References Cited

U.S. PATENT DOCUMENTS

| | | | |
|---|---|---|---|
| 7,100,382 B2 * | 9/2006 | Butler et al. ................ 62/126 |
| 7,355,359 B2 * | 4/2008 | Kuo ........................... 318/268 |
| 7,444,824 B1 * | 11/2008 | Butler et al. ................ 62/230 |
| 7,464,561 B1 * | 12/2008 | Butler et al. ................ 62/181 |
| 7,501,717 B2 * | 3/2009 | Chen ........................... 307/38 |
| 7,541,762 B2 * | 6/2009 | Chen et al. .................. 318/434 |
| 2005/0016191 A1 * | 1/2005 | Butler et al. ................ 62/158 |
| 2007/0019383 A1 * | 1/2007 | Chang ........................ 361/695 |
| 2007/0108923 A1 * | 5/2007 | Chen .......................... 318/66 |
| 2007/0148019 A1 * | 6/2007 | Chen ....................... 417/423.1 |
| 2007/0229291 A1 * | 10/2007 | Kuo ........................... 340/584 |
| 2007/0292257 A1 * | 12/2007 | Ooi et al. ..................... 415/1 |
| 2008/0004755 A1 * | 1/2008 | Dunstan et al. ............ 700/299 |
| 2008/0095521 A1 * | 4/2008 | Chen et al. .................. 388/829 |
| 2009/0003806 A1 * | 1/2009 | Zou et al. .................... 388/811 |
| 2009/0162039 A1 * | 6/2009 | Zou et al. .................... 388/811 |
| 2009/0169188 A1 * | 7/2009 | Huang et al. ................ 388/811 |
| 2009/0175602 A1 * | 7/2009 | Qian et al. .................. 388/825 |
| 2009/0208192 A1 * | 8/2009 | Xi et al. ...................... 388/819 |

* cited by examiner

*Primary Examiner*—Paul Ip
(74) *Attorney, Agent, or Firm*—Frank R. Niranjan

(57) ABSTRACT

A circuit for controlling rotation speed of a computer fan includes a fan header for connecting to a 4-pin fan or a 3-pin fan, a jumper device, an amplifier, and a controller. The jumper device has a first pin for receiving a controlling signal, and connected to a first power source, a second pin connected to the fan header, and a third pin connected to the first power source. The amplifier has an input terminal connected to the third pin of the jumper device via an integrator. The controller has a first terminal connected to an output terminal of the amplifier, a second terminal connected to a second power source, and a third terminal connected to the fan header and connected to a positive input terminal of the amplifier via a resistor. The first pin of the jumper device is selectively connected to the second or third pin.

12 Claims, 2 Drawing Sheets

US 7,702,223 B2

CIRCUIT FOR CONTROLLING ROTATION SPEED OF COMPUTER FAN

CROSS-REFERENCES TO RELATED APPLICATION

Relevant subject matter is disclosed in a co-pending U.S. patent application entitled "METHOD AND CIRCUIT FOR CONTROLLING ROTATION SPEED OF COMPUTER FAN", filed on Dec. 11, 2007 with application Ser. No. 11/953,866, and a U.S. patent application entitled "CIRCUIT FOR CONTROLLING ROTATION SPEED OF COMPUTER FAN", filed on Jan. 30, 2008 with application Ser. No. 12/023,012, and assigned to the same assignee as these applications.

BACKGROUND

1. Field of the Invention

The present invention relates to computer fans, and particularly to a circuit for controlling rotation speed of a computer fan.

2. Description of Related Art

A computer system includes a motherboard with various chips such as a central processing unit (CPU) mounted thereon, a storage device such as a hard disc, and input/output devices. Many of these devices generate heat when the computer system is operating, particularly the CPU. If the heat generated from the CPU is not dissipated in a timely fashion, it may damage the CPU or even the computer system.

Typically, a sensor is programmed to be used as a temperature detector for detecting the temperature of the CPU. A computer fan is used to facilitate removal of heat to keep the temperature of the CPU within a safe temperature range. A fan controller is provided to adjust the fan speed to be more energy efficient while still providing enough heat dissipation. Two common kinds of computer fans are 3-pin fans and 4-pin fans. The fan speed of a 3-pin fan can be adjusted by changing a voltage signal (power signal) input to the 3-pin fan. The fan speed of a 4-pin fan, can be adjusted by a pulse-width modulation (PWM) signal controlled by a basic input/output system (BIOS) of the motherboard directly to the 4-pin fan.

With a 3-pin fan motherboard, a 3-pin fan is connected to the motherboard by a 3-pin header mounted on the motherboard, and a 3-pin fan controller is provided to supply the voltage signal to the 3-pin fan for adjusting the rotation speed of the 3-pin fan. With a 4-pin fan motherboard, a 4-pin fan is connected to the motherboard by a 4-pin fan header mounted on the motherboard, and a 4-pin fan controller is provided to supply the PWM signal to the fourth pin of the 4-pin fan for adjusting the rotation speed of the 4-pin fan. In theory, the 3-pin fan can be connected to the 4-pin fan motherboard by the 4-pin header. However, the 3-pin fan cannot be controlled by the 4-pin fan controller because the 3-pin fan does not have the fourth pin and cannot receive the PWM signal. Therefore, the CPU may be damaged because the heat may not be dissipated properly.

What is needed is a circuit for adjusting the rotation speed of a computer fan whether the computer fan is a 3-pin fan or a 4-pin fan.

SUMMARY

An exemplary circuit for controlling rotation speed of a computer fan includes a fan header configured for connecting to a 4-pin fan or a 3-pin fan, a jumper device, an amplifier, and a controller. The jumper device has a first pin configured for receiving a controlling signal, and connected to a first power source, a second pin connected to the fan header, and a third pin connected to the first power source. The amplifier has an input terminal connected to the third pin of the jumper device via an integrator. The controller has a first terminal connected to an output terminal of the amplifier, a second terminal connected to a second power source, and a third terminal connected to the fan header and connected to a positive input terminal of the amplifier via a resistor. The first pin of the jumper device is selectively connected to the second or third pin.

Other novel features and advantages will become more apparent from the following detailed description of preferred and exemplary embodiments when taken in conjunction with the accompanying drawings, in which:

DETAILED DESCRIPTION

Figure 1:
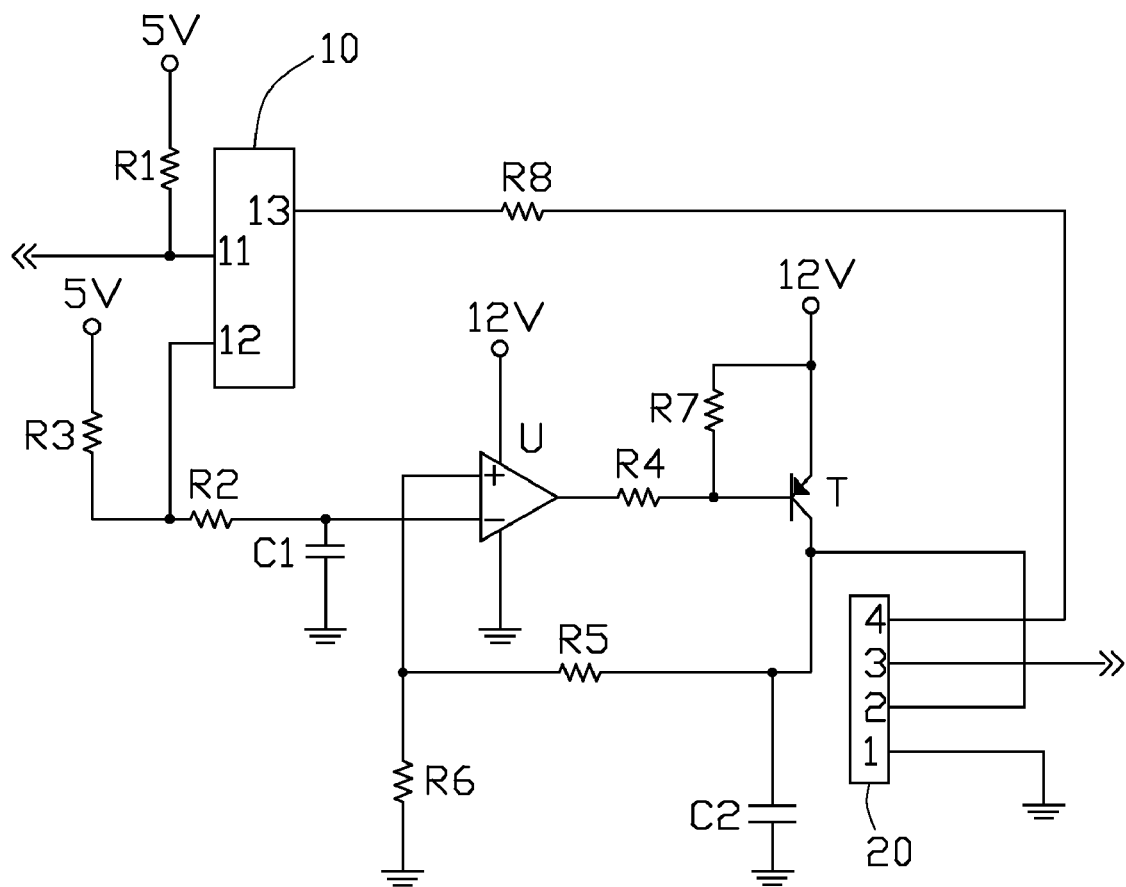
FIG. 1 is a diagram of a circuit for controlling rotation speed of a computer fan in accordance with an exemplary embodiment of the present invention.

Referring to FIG. 1, a circuit for controlling rotation speed of a computer fan in accordance with an exemplary embodiment of the present invention includes a jumper device 10 having three pins 11, 12, and 13, a transistor T functioning as a controller, an amplifier U, a fan header having 4 pins 1, 2, 3, and 4, a plurality of resistors R1~R7, and two capacitors C1, C2.

The pin 11 of the jumper device 10 is connected to a 5V power source via the resistor R1, and is connectable to the pin 12 or 13 of the jumper device 10 by a jumper selectively. The pin 12 of the jumper device 10 is grounded via the resistor R2 and the capacitor C1, which form an integrator by being connected in series, and also being connected to the 5V power source via the resistor R3. The pin 13 of the jumper device 10 is connected to the pin 4 of the fan header. In this embodiment, the pin 11 of the jumper device 10 is configured for receiving a PWM signal controlled by a super input/output (SIO) controller of the motherboard.

The amplifier U includes a negative input terminal which is connected to a node between the resistor R2 and the capacitor C1, a positive input terminal which is grounded via the resistor R6, a power terminal connected to a 12V power source, and an output terminal.

The base of the transistor T is connected to the output terminal of the amplifier U via the resistor R4, the emitter of the transistor T is connected to the 12V power source, and connected to the base via the resistor R7, the collector of the transistor T is connected to the pin 2 of the fan header 20, and connected to the positive input terminal of the amplifier U via the resistor R5, and is grounded via the capacitor C2.

The pin 1 of the fan header 20 is grounded, and the pin 3 is configured for connecting to the SIO controller to detect temperature of the CPU.

If the computer fan is a 3-pin fan, the pin 11 of the jumper device 10 is connected to the pin 12 via the jumper. When the motherboard is turned on, the SIO controller sends a PWM signal according to temperature of the CPU to the negative input terminal of the amplifier U via the integrator, which rectifies the PWM signal (digital voltage signal) to an analog voltage signal. The amplifier U receives the analog voltage signal and outputs an amplified voltage signal. The amplified voltage signal controls a quiescent operating point of the transistor T via the resistor R4, and the transistor T outputs a fan control signal based on the voltage signal to the pin 2 of the fan header 20. Therefore, the 3-pin fan connected to the fan header 20 is adjusted by changing the quiescent operating point of the transistor T.

If the computer fan is a 4-pin fan, the pin 11 of the jumper device 10 is connected to the pin 13 via the jumper. When the motherboard is turned on, the 5V power source outputs an invariable voltage to the negative input terminal of the amplifier U via the resistors R2 and R3, and the amplifier U outputs an invariable voltage to the base of the transistor T. The 12V power source provides a working voltage for the 4-pin fan via the transistor T and the pin 2 of the fan header 20.

When the motherboard is turned on, the SIO controller sends a PWM signal to the fan header 20, and changes the rotation speed of the 4-pin fan connected to the fan header 20 by adjusting the duty cycle of the PWM signal according to temperature of the CPU. Therefore, the 4-pin fan is adjusted by using PWM signals.

Figure 2:
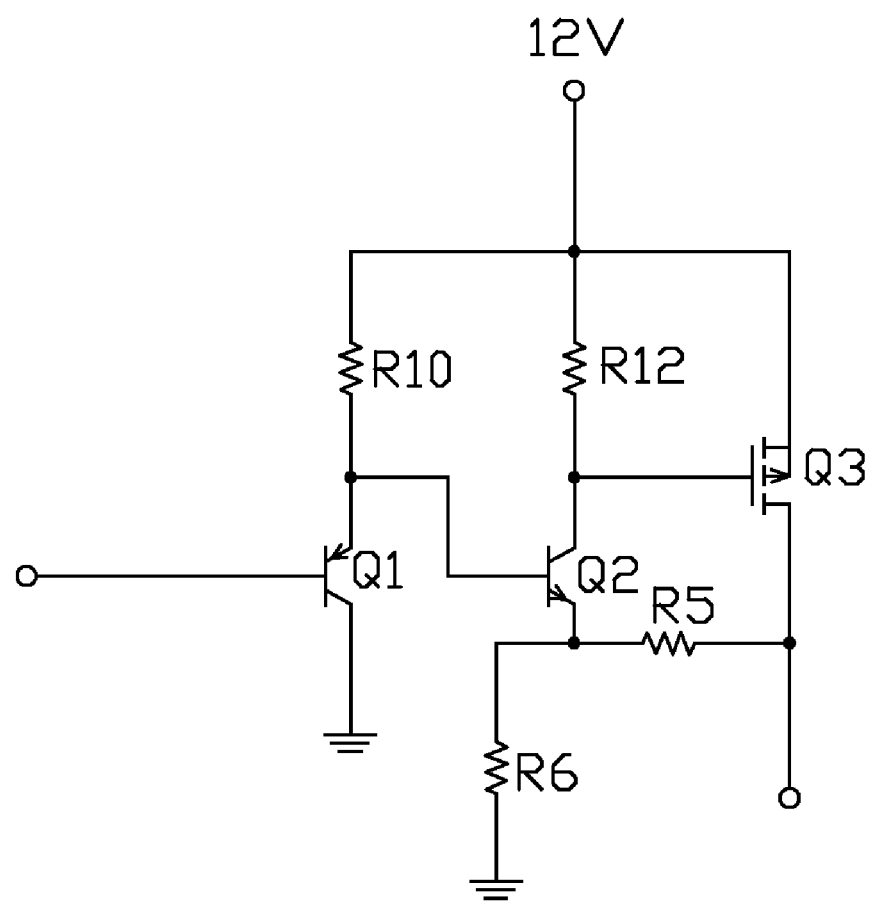
FIG. 2 is a diagram of another exemplary embodiment of the amplifier of FIG. 1.

Referring to FIG. 2, in a second exemplary embodiment of the invention, the amplifier U is replaced with a positive-negative-positive (PNP) transistor Q1 and an negative-positive-negative (NPN) transistor Q2, the transistor T is replaced with a P-channel metallic oxide semiconductor field effect transistor (P-channel MOSFET) Q3. The base of the transistor Q1 is connected to the node between the resistor R2 and the capacitor C1, the emitter of the transistor Q1 is connected to the 12V power source via a resistor R10, and the collector of the transistor Q1 is grounded. The base of the transistor Q2 is connected to the emitter of the transistor Q1, the collector of the transistor Q2 is connected to the 12V power source via a resistor R12, and the emitter of the transistor Q2 is grounded via the resistor R6. The gate of the P-channel MOSFET Q3 is connected to the collector of the transistor Q2, the source of the P-channel MOSFET Q3 is connected to the 12V power source, and the drain of the P-channel MOSFET Q3 is connected to the pin 2 of the fan header 20 and further connected to the emitter of the transistor Q2 via the resistor R5. A drain current of the transistor Q3 is changed by changing the channel width of the transistor Q3, therefore, the rotation speed of the 3-pin fan is adjusted. And the 4-pin fan can be adjusted by using PWM signals.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A circuit for controlling rotation speed of a computer fan, the circuit comprising:
    a fan header configured for connecting to a 4-pin fan or a 3-pin fan;
    a jumper device having a first pin configured for receiving a controlling signal which is controlled by a super input/output (SIO) controller, and connected to a first power source, a second pin connected to the fan header, and a third pin connected to the first power source;
    an amplifier comprising a negative input terminal connected to the third pin of the jumper device via an integrator; and
    a controller comprising a first terminal connected to an output terminal of the amplifier, a second terminal connected to a second power source, and a third terminal connected to the fan header and connected to a positive input terminal of the amplifier via a first resistor;
    when a 3-pin fan is connected to the fan header, the first pin of the fan header is connected to the third pin, the controlling signal is converted to an analog signal by the integrator, the analog signal is amplified by the amplifier, an amplified signal output from the amplifier adjusts the rotation speed of the 3-pin fan by controlling a quiescent operating point of the controller, when a 4-pin fan is connected to the fan header, the first pin of the fan header is connected to the second pin, the duty cycle of the controlling signal is adjusted by the SIO controller, to adjust the rotation speed of the 4-pin fan.

2. The circuit as claimed in claim 1, wherein the fan header has a first pin grounded, a second pin connected to the third terminal of the controller, a third pin connected to the SIO controller, and a fourth pin connected to the second pin of the jumper device.

3. The circuit as claimed in claim 1, wherein the controller is a positive-negative-positive (PNP) transistor, the first, second and third terminals of the controller are respectively the base, emitter and collector of the PNP transistor.

4. The circuit as claimed in claim 1, wherein the controller is a P-channel metallic oxide semiconductor field effect transistor (MOSFET), the first, second and third terminals of the controller are respectively the gate, source and drain of the P-channel MOSFET.

5. The circuit as claimed in claim 1, wherein the controlling signal is a pulse-width modulation (PWM) signal.

6. The circuit as claimed in claim 1, wherein the positive input terminal of the amplifier is grounded via a second resistor.

7. A circuit for controlling rotation speed of a computer fan comprising:
    a fan header configured for connecting to a 4-pin fan or a 3-pin fan;
    a jumper device having a first pin configured for receiving a controlling signal which is controlled by a super input/output (SIO) controller, and connected to a first power source, a second pin connected to the fan header, and a third pin connected to the first power source;
    an amplifier comprising an input terminal connected to the third pin of the jumper device via an integrator; and
    a controller comprising a first terminal connected to an output terminal of the amplifier, a second terminal connected to a second power source, and a third terminal connected to the fan header and connected to the amplifier via a first resistor;
    when a 3-pin fan is connected to the fan header, the first pin of the fan header is connected to the third pin, the controlling signal is converted to an analog signal by the integrator, and amplified by the amplifier, the amplified signal adjusts the rotation speed of the 3-pin fan by controlling a quiescent operating point of the controller, when a 4-pin fan is connected to the fan header, the first pin of the fan header is connected to the second pin, the duty cycle of the controlling signal is adjusted by the SIO controller, to adjust the rotation speed of the 4-pin fan.

8. The circuit as claimed in claim 7, wherein the amplifier comprises an negative-positive-negative (NPN) transistor and a positive-negative-positive (PNP) transistor, the base of the PNP transistor and the collector of the NPN transistor act as the input terminal and the output terminal of the amplifier respectively, the collector of the PNP transistor is grounded and the emitter of the PNP transistor is connected to the base of the NPN transistor, and connected to the second power source, the emitter of the NPN transistor is connected to the third terminal of the controller via the first resistor, and is grounded via a second resistor.

9. The circuit as claimed in claim 7, wherein the fan header comprises a first pin which is grounded, a second pin connected to the third terminal of the controller, a third pin connected to the SIO controller, and a fourth pin connected to the second pin of the jumper device.

10. The circuit as claimed in claim 7, wherein the controller is a PNP transistor, the first, second and third terminals of the controller are respectively the base, emitter and collector of the PNP transistor.

11. The circuit as claimed in claim 7, wherein the controller is a P-channel metallic oxide semiconductor field effect transistor (MOSFET), the first, second and third terminals of the controller are respectively the gate, source and drain of the P-channel MOSFET.

12. The circuit as claimed in claim 7, wherein the controlling signal is a pulse-width modulation signal.

* * * * *